Nov. 9, 1926.
R. W. KEELER
1,606,370
STARTING MECHANISM FOR ROLLER TRACTORS
Filed June 23, 1925      2 Sheets-Sheet 2
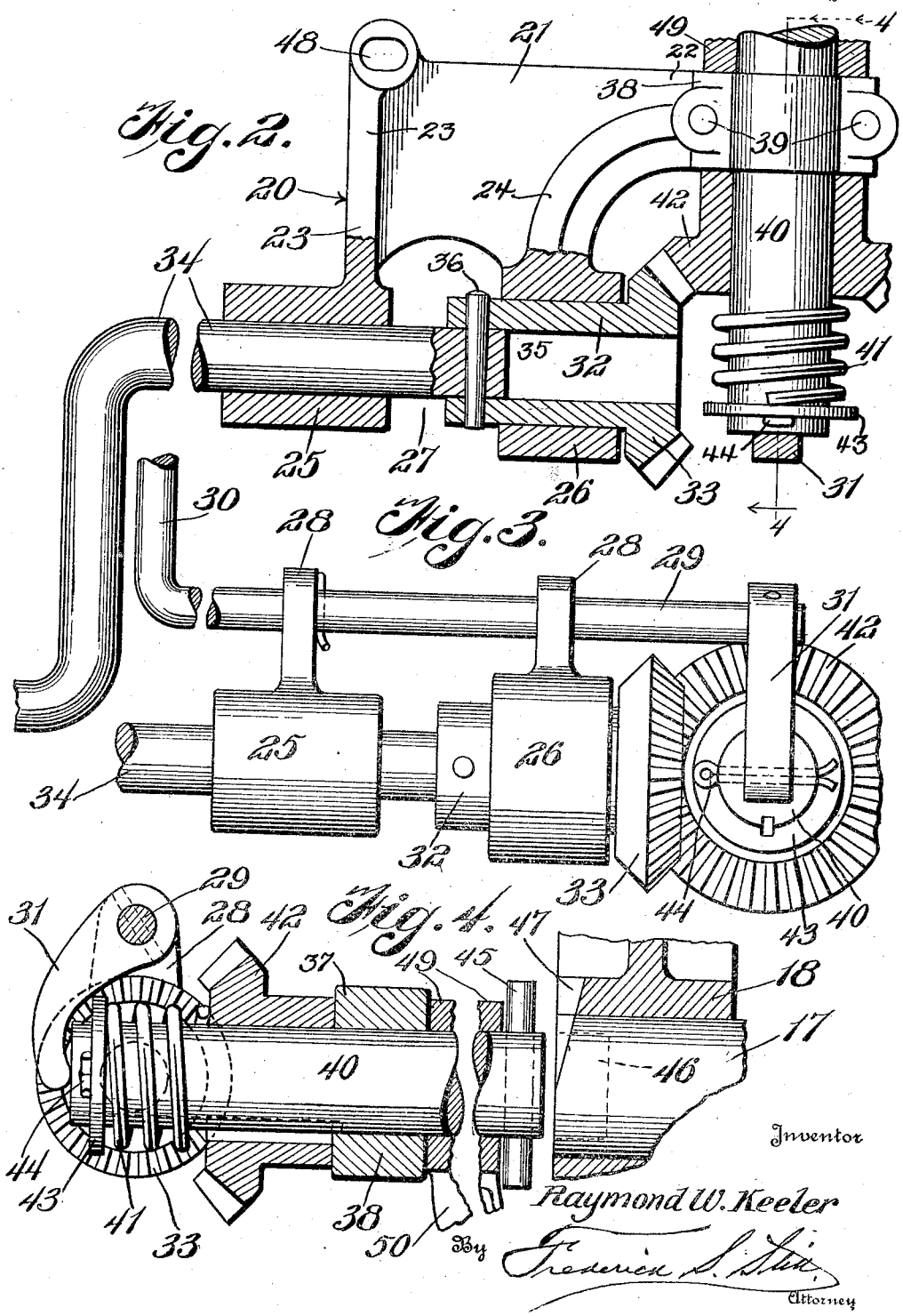
Inventor
Raymond W. Keeler
By Frederick S. Hill
Attorney Patented Nov. 9, 1926.

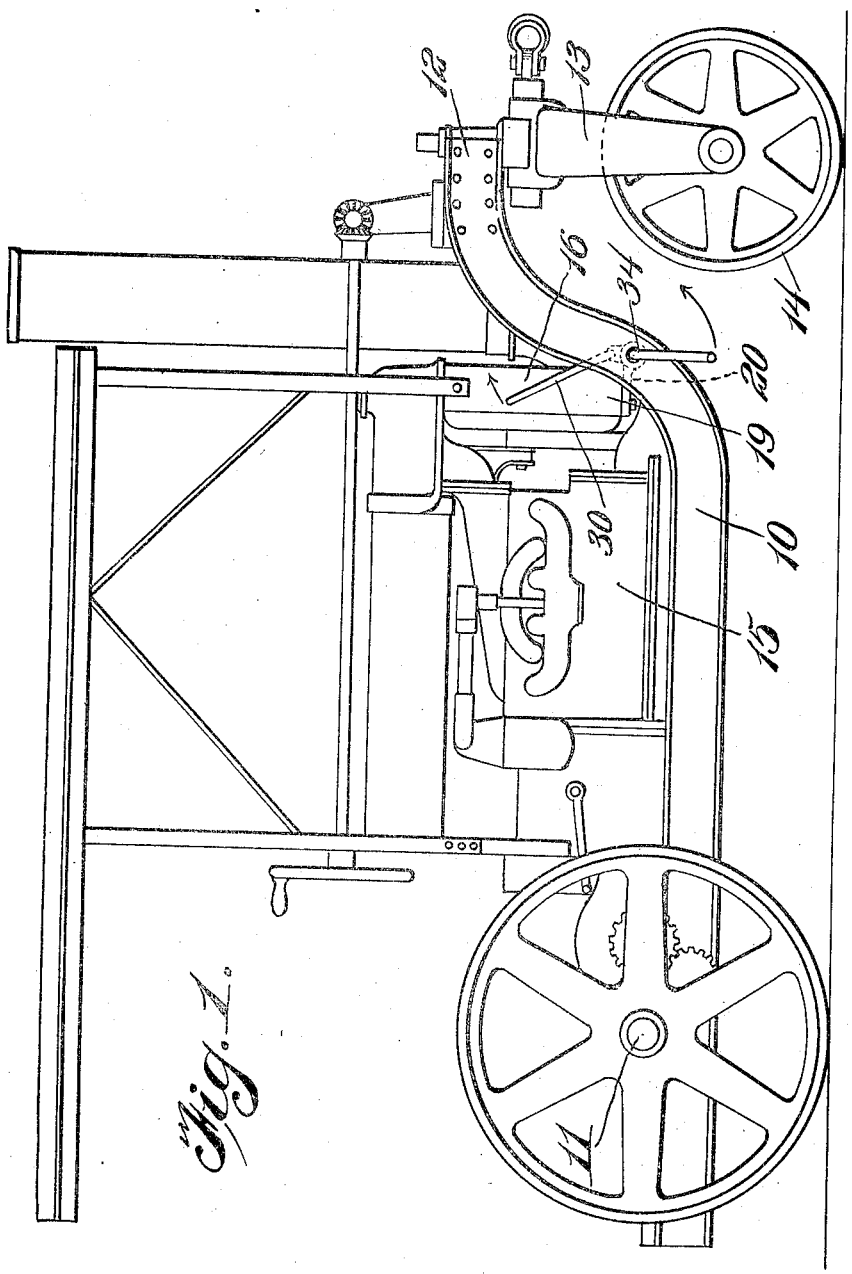

1,606,370

UNITED STATES PATENT OFFICE.

RAYMOND W. KEELER, OF GALION, OHIO, ASSIGNOR TO THE GALION IRON WORKS & MFG. CO., OF GALION, OHIO, A CORPORATION OF OHIO.

STARTING MECHANISM FOR ROLLER TRACTORS.

Application filed June 23, 1925. Serial No. 39,134.

This invention relates to tractors, and particularly to starting devices designed particularly for use with the form of tractor illustrated, described and claimed in my pending application for patent on Fordson roller tractor, Serial No. 724,907, filed on the 8th day of July, 1924, this present application being a continuation in part of my application Serial No. 724,908, filed on July 8, 1924, on starting mechanism for roller tractors.

In the Fordson tractor, the motor is started by a starting crank projecting out from the forward end of the machine immediately beneath the radiator and through the cylinder front cover, and until the advent of the starting mechanism now in use there were many accidents even with ordinary Ford motor cars due to the engine being started and the clutch either not having been thrown out or slipping.

The Fordson tractor is also started from the front by cranking, and here there have been many accidents and some loss of life due to the tractor starting up while a person was cranking and running over the operator. Furthermore, it is common to mount Fordson power plants on many different forms of tractors and also on different forms of road rollers. Such a road roller with a Fordson tractor unit or power plant is illustrated in my application Serial No. 724,907, filed on July 8, 1924, and previously referred to. While it is dangerous to crank the ordinary Fordson tractor, it is extremely difficult and even more dangerous to crank a Fordson engine or power plant when the same is mounted upon the frame of a tractor whose wheels are in advance of the power plant or a roller tractor, as in this case it is necessary that the operator should stoop down or crawl beneath the forward end of the power plant supporting frame and the front rollers and there operate the crank, in which position he is obviously very likely to be very badly injured in case the engine starts up, which it is liable to do, and may be quite badly injured by the crank striking him when he is in a cramped position between the forward end of the frame and the front rollers. Many accidents have actually occurred from this source, and it is the object of the present invention to do away with this cranking mechanism which necessitates cranking from in front of the power plant and provide in place thereof cranking mechanism which is operated from the side of the power plant.

A further object of the invention is to provide means for starting up the engine of the roller tractor, which is so constructed that the ordinary crank furnished with the Fordson tractor may be used to start the engine from the side of the tractor.

A still further object is to provide a starting mechanism of the character stated which is normally out of engagement with the driving shaft of the engine but which may be readily shifted into engagement therewith by the operator, which will permit the starting mechanism to held in engagement with the driving shaft of the tractor by friction as the starting mechanism and the shaft are rotated to start the engine but which will cause the release of the engagement between the starting mechanism and the crank shaft when the crank shaft speeds up beyond the speed of the starting mechanism.

Other objects have to do with the details of construction and arrangement of parts as will appear more fully hereinafter.

My invention is illustrated in the accompanying drawings, wherein:—

Figure 1 is a side elevation of a tractor roller having my invention applied thereto;

Figure 2 is a top plan view partly in section of my cranking mechanism;

Figure 3 is a front elevation of the structure shown in Figure 2;

Figure 4 is a section on the line 4—4 of Figure 2.

Referring to the drawings, it will be seen that in Figure 1 I have illustrated a road roller such as forms the subject-matter of my application for Patent, Serial No. 724,907, filed on the 8th day of July, 1925, this roller including the laterally disposed frame bars 10 which are operatively supported upon the rear axle 11 in the manner disclosed in said application, these frame bars extending forward in parallel relation in a horizontal plane, then extending convergently upward and forward and being connected at their forward ends, as at 12, to a yoke 13 which supports the axle of the forward roller or rollers 14.

Mounted upon the frame 10 is a power plant which, as illustrated, is the engine of the ordinary Fordson tractor, this engine being designated generally 15, and having the usual radiator 16. Disposed below the radiator and extending longitudinally of the engine is the crank shaft 17 which is provided with a fan wheel 18, this crank shaft being so constructed at its forward end that it will engage with the ordinary starting crank.

It will be seen with the construction which has been described that it would be necessary for the person starting the engine to crawl in between the front rollers and the forward end of the engine and there operate the starting crank. This is extremely difficult to do in this cramped position and, as before stated, very dangerous. In order to avoid this inconvenience and danger, I provide means whereby the engine may be started from the side of the frame instead of in front of the engine. To this end I mount upon the lower section 19 of the radiator the shaft bracket, designated 20 as a whole, this shaft bracket comprising a web 21 having at its hear a lateral extension 22 and having forwardly extending ribs 23 and 24, the latter being curved from the extension 22.

Formed integral with the web 21 and with the the ribs 23 and 24, are the tubular bearing portions 25 and 26, these bearing portions being connected by the integral web 21 but being separated, as at 27, by a substantial space for a purpose which will be later disclosed. Each of these bearing portions 25 and 26 is formed with the upwardly extending lugs 28 constituting a bearing or support for a rotatable rod or small shaft 29 having an upwardly extending arm 30 at its outer end, the inner end of this shaft having a downwardly extending curved finger 31.

Mounted within the bearing 26 is the hollow or tubular shank 32 of a beveled gear wheel 33, and disposed through the bearing member 25 and rotatable therein is the shank of the ordinary Fordson starting crank 34. This starting crank has its rear end inserted within the bore 35 of the shank 32 and is pinned thereto by a transversely extending pin 36 which passes through the tubular shank 32 and through the starting crank. It is for the purpose of driving this pin into place and permitting the use of the regular Fordson starting crank that the bearings 25 and 26 are spaced from each other, as if they were not so spaced it would be impossible to use the ordinary starting crank as it would be impossible to drive the pin 36 through the end of the crank and through the shaft 34. The extension 22 of the bracket 20 is formed to provide the upper half 37 of a bearing, the lower half of which is designated 38, this bearing having its axis, of course, at right angles to the axis of the bearings 25 and 26. These sections are held together by bolts or other suitable means 39 passing through apertures in the respective parts. Disposed within this bearing formed by the parts 37 and 38 is a shaft 40 which is longitudinally shiftable in the bearing and which is in alignment with the crank shaft 17 of the Fordson engine. This shaft section 40 is normally urged forward and out of operative engagement with the extremity of the crank shaft 17 by means of a spring 41 which bears against the hub of a beveled gear wheel 42 meshing with the beveled gear wheel 33, the forward end of the spring bearing against a disk 43 mounted upon the end of the shaft 40 and held in place by a cotter pin 44. The beveled gear wheel 42 is splined upon the shaft 40 and is held from any longitudinal movement by spring 41 bearing against it, the gear in turn bearing against the bearing 37 so that the gear wheel will turn with the shaft 40 but the shaft may have movement longitudinally through the gear wheel.

The finger 31 is, as before remarked, mounted upon the manually operable shaft 29. This finger extends down and over the extremity of the shaft 40 so that when this finger 31 is given a counterclockwise movement it will press against the extremity of shaft 40 and force the shaft rearward into operative engagement with the extremity of the shaft 18. The extremity of this shaft 17 carries upon it the usual fan wheel 18. The rear end of the shaft 40 has a transversely extending pin 45 and the shaft 17 at its forward end is formed with a central socket 46 with a radially extending, beveled slot 47, as usual.

The shaft bracket 20 is held in place by a screw which passes through an opening 48 formed at the extremity of the rib 23 and which screw extends up into the bottom section of the radiator and is also supported by reason of the fact that the shaft 40 passes through the bearing 49 which is commonly found on all Fordson tractors, this bearing being the one in which the shank of the starting crank is supported and this bearing forming the terminal end of the usual front end support found on Fordson tractors which I have designated 50.

The operation of this device will be obvious from what has gone before. When it is desired to crank the machine, the arm 30 is pulled in a direction to cause a rotation of the shaft 29 and the movement of the finger 31 toward and against the extremity of the shaft 40. This will force the shaft 40 rearward against the action of the spring 41 and the shaft 40 will be carried into the socket 45 and the pin 46 will be carried into the radial slot 47. When this has been accomplished, a rotation of the starting crank 34 will start up the motor. As soon as tension is applied there will be enough frictional engagement between the shafts 17 and 40 to hold these two parts in engagement with each other against the action of the spring 41 and, just as in the ordinary Ford car or Fordson tractor, as soon as the motor starts and increases its speed beyond a certain point, the motor shaft 17 will overrun the shaft 40 and release the same and will move forward under the action of spring 41, thus clearing the pin 45 from its engagement with the notch or groove 47. The shaft 17 is caused to release its engagement with shaft 40 by the cam action of the slot 47 on the pin 45, this being the usual action in devices of this character.

It will be seen that the crank shaft 34 extends through one of the side frames 10, as shown in Figure 1, to the exterior of the side frame so that this starting crank may be manipulated from the side of the machine. It will be seen that with this construction the motor may be started without the operator getting in front of the machine at all and, therefore, without any danger and without the operator having to get under the machine or operate in a cramped and relatively small space. Furthermore, this device permits Fordson engines to be used in connection with tractors and particularly in connection with road rollers having parts, such as the wheels thereof, which are disposed to obstruct access to the crank shaft and disposed forward of the engine.

While I have illustrated this device as applied to such an implement as a road roller, I do not wish to be limited thereto as while it is particularly adapted for these road rollers it is also adapted to different forms of tractors and other implements such as road maintainers, scarifiers, graders and the like and wherever the tractor having the power plant is formed with or carries a road-engaging instrument forward of and which would tend to prevent or obstruct easy manipulation of the ordinary starting crank.

It will be seen that I have provided a unitary device which may be readily applied to all Fordson engines for the purpose of cranking the Fordson engine from the side and which is particularly adapted to be applied as a unit to the roller tractor shown in my prior application above referred to.

I claim:—

1. A starting device for internal combustion engines having a radiator and having a longitudinally extending power shaft extending beneath the radiator comprising a casting adapted to be disposed beneath the radiator, the casting embodying a bearing extending longitudinally of the engine and a bearing in advance of the first named bearing and extending transversely of the engine, a starting shaft mounted within the last named bearing and extending out through the side of the engine and there provided with a crank, a gear wheel on this last named shaft, a shaft mounted within the first named bearing for longitudinal movement toward and from the power shaft, said last named shaft being formed at its inner end to operatively engage the power shaft, a beveled gear wheel mounted on the last named shaft and engaging the first named beveled gear wheel, a spring urging the last named shaft outward and away from the power shaft, the casting being formed with upwardly projecting ears, and a rock shaft mounted in said ears and having at its outer end an arm whereby it may be manipulated and at its inner end a finger engaging the extremity of the longitudinally shiftable shaft.

2. A starting device for an internal combustion engine which includes a radiator and a longitudinally extending power shaft, said starting device comprising a casting adapted to be disposed below the radiator and attached thereto, the casting being formed to provide a longitudinally extending bearing and a laterally extending bearing, the laterally extending bearing having an opening between its ends, a tubular shaft section mounted within this bearing and carrying a beveled gear wheel, a crank extending through the bearing to the side of the tractor and having its end inserted in the tubular gear wheel and pinned thereto, a shaft mounted within the longitudinally extending bearing for longitudinal movement therein and in alignment with the power shaft, means on the inner end of this last named shaft detachably engageable with the approximate end of the power shaft, a gear wheel mounted upon the last named shaft and through which the last named shaft slides, the gear wheel meshing with the first named gear wheel and having rotative engagement with the last named shaft, a spring surrounding the shaft and bearing at one end against said gear wheel and at the other end operatively bearing against the end of the shaft to urge the shaft longitudinally away from the power shaft, ears formed on the casting and disposed in transverse alignment, and a rock shaft disposed in said ears and a finger mounted upon the inner end of the rock shaft and engageable with the extremity of the longitudinally shiftable shaft, the opposite end of the rock shaft having an arm whereby it may be manipulated.

3. A starting device for internal combustion engines and adapted to crank the engine from one side, said engine having a longitudinally extending power shaft having a socket and a radial notch at its forward end, a radiator disposed above the power shaft and a bearing for the starting crank disposed in alignment with the power shaft, said starting device comprising a supporting bracket having a bearing adapted to align with the bearing for the shank of the starting crank and having a bearing at right angles thereto and in advance thereof, a shaft mounted in the first named bearings and having at its rear end means for rotatively engaging the forward end of the power shaft, a spring normally urging said second named shaft away from the power shaft, a beveled gear wheel mounted for rotation upon the second named shaft but through which the second named shaft slides, a shaft extending through the transverse bearing and carrying a beveled gear wheel adapted to engage the first named beveled gear wheel, said second named shaft having a crank handle, and manually operable means mounted upon said support whereby the second named shaft may be shifted inward into engagement with the power shaft and against the force of said spring, the bracket having means at one corner whereby it may be held in engagement with the lower end of said radiator.

4. The combination with a tractor roller having front and rear rollers, a supporting frame, an internal combustion engine mounted upon said frame between the forward and rear rollers and including a longitudinally extending power shaft adapted to be started from the forward end of the engine, the forward roller obstructing access to said power shaft, of starting mechanism for the engine including a transversely extending crank shaft mounted upon the frame of the engine and having a crank disposed exteriorly of the engine and rearward of the front roller, a longitudinally extending shaft disposed in alignment with the power shaft and operatively engaged at all times with the transversely extending crank shaft, manually operable means for shifting said second named shaft rearward and into engagement with the power shaft of the engine, and a spring normally urging the second named shaft out of engagement with the power shaft of the engine.

5. The combination with a tractor roller having a supporting frame comprising two longitudinally extending beams, the beams at their forward ends extending upward and convergently, a yoke supporting the forward ends of the beams, an axle extending through the yoke, a roller mounted upon the yoke, a pair of rear rollers supporting the rear end of the frame, an internal combustion engine mounted upon said frame and including a longitudinally extending power shaft or a longitudinally extending drive shaft, of means for starting the engine comprising a shaft disposed in alignment with the power shaft and operatively supported below the radiator of the engine, said shaft being longitudinally shiftable and having means at its rear end whereby it may be operatively connected to the power shaft when shifted rearward, a spring urging said shaft forward out of engagement with the power shaft, a beveled gear wheel splined upon said starting shaft, a transverse shaft mounted below the engine and extending laterally outward through the frame, a crank mounted on this shaft exteriorly of the frame, a beveled gear wheel mounted on the shaft and meshing with the first named beveled gear wheel, a shaft supported above the last named shaft and extending transversely thereof and having means at one end whereby it may be oscillated, and a finger at the other end of the shaft bearing against the starting shaft and adapted, when the finger is pressed inward, to shift the starting shaft into engagement with the power shaft of the engine.

In testimony whereof I affix my signature.

RAYMOND W. KEELER.